United States Patent [19]
Dietz

[11] Patent Number: 5,387,155
[45] Date of Patent: Feb. 7, 1995

[54] BEET HARVESTER

[75] Inventor: Paul F. Dietz, Wahpeton, N. Dak.

[73] Assignee: Red River Service Center Inc., Wahpeton, N. Dak.

[21] Appl. No.: 45,885

[22] Filed: Apr. 14, 1993

[51] Int. Cl.⁶ .............................................. A01D 25/04
[52] U.S. Cl. ...................................... 460/132; 15/3.11; 171/58
[58] Field of Search .......................... 460/132, 98, 904; 171/58, 10, 25, DIG. 1; 15/3.1, 3.11

[56] References Cited

U.S. PATENT DOCUMENTS

| | | | |
|---|---|---|---|
| 4,024,920 | 5/1977 | Haverdink | 171/58 |
| 4,192,386 | 3/1980 | Haverdink et al. | 171/58 |
| 4,197,916 | 4/1980 | Haverdink et al. | 15/3.11 X |
| 5,197,550 | 3/1993 | Barnard | 171/58 |

*Primary Examiner*—Terry Lee Melius
*Attorney, Agent, or Firm*—Herman H. Bains

[57] ABSTRACT

A towed type beet harvester includes a main frame having ground engaging wheels and having a lifter wheel assembly for excavating beets, potatoes, carrots and similar root crops. A front set of grab rollers are positioned rearwardly of the lifter wheel assembly and are coated with a high impact plastic material to minimize damage to the harvested crop. A rear set of grab rollers are positioned rearwardly of the front set of rollers and are also coated with a high impact plastic material. A vertically disposed discharge wheel assembly is positioned interiorly of the harvester main frame and conveys harvested crop to a reversible discharge conveyor. An open top holding tank is mounted at the rear of the harvester for temporarily holding the harvested crop during the harvesting operation.

10 Claims, 3 Drawing Sheets

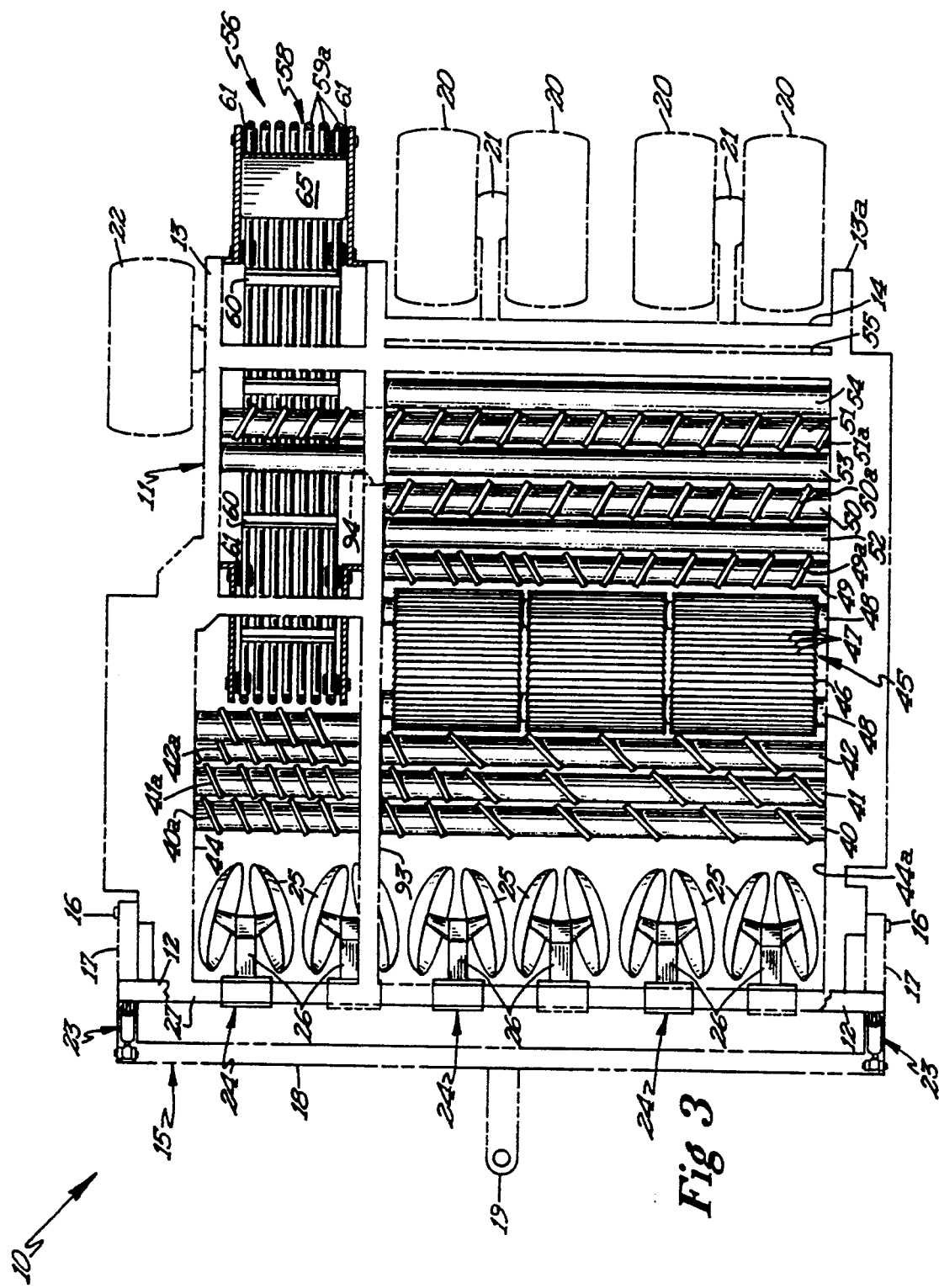

BEET HARVESTER

FIELD OF THE INVENTION

This invention relates to a harvesting machine and more particularly to a machine for harvesting sugar beets, potatoes, carrots and similar root crops.

BACKGROUND OF THE INVENTION

Harvesting machines, usually described as beet harvesters, which are used to harvest sugar beets, potatoes and other root crops typically excavate, clean and discharge the crops into a truck for transport to a processing plant. The crops are temporarily stored in piles at the processing plant until these crops can be processed. In the conventional beet harvesting machine, the excavated beets, potatoes or other crops are cleaned by various cleaning devices including cleaning rolls before the crops are discharged from the harvesting machine. It is desirable to clean the beets or potatoes as efficiently as possible while minimizing damage to the beets or potatoes. Beets, potatoes or other root crops are often damaged by the cleaning mechanisms during the harvesting operation. For example, damaged beets bleed prior to further processing and thereby diminish the yield of the beets.

SUMMARY OF THE INVENTION

It is an object of this invention to provide a novel and improved beet harvester, which is highly efficient in cleaning the beets, potatoes or other root crops and which is arranged and constructed to minimize damage to the beets, potatoes or other root crops.

Another object of this invention is to provide a beet harvesting apparatus which is compactly designed to permit easy transport while permitting efficient harvesting of more rows without excessive width.

The novel and improved beet harvester is a towed type apparatus and includes a lifter wheel assembly which excavates and directs beets, potatoes or other root crops rearwardly upon grab rollers where the beets are directed to one side of the apparatus. The beets are then directed rearwardly by chain conveyors and thereafter delivered by additional grab rollers to a vertically disposed discharge wheel. The discharge wheel elevates the cleaned beets to a discharge conveyor where the beets are selectively delivered to a truck or to a holding tank on the beet harvester. The various cleaning rolls are coated with a suitable high impact plastic material to minimize damage to the beets.

FIGURES OF THE DRAWING

FIG. 3 is a top plan view of the beet harvester.

DESCRIPTION OF THE PREFERRED EMBODIMENT

Figure 1:
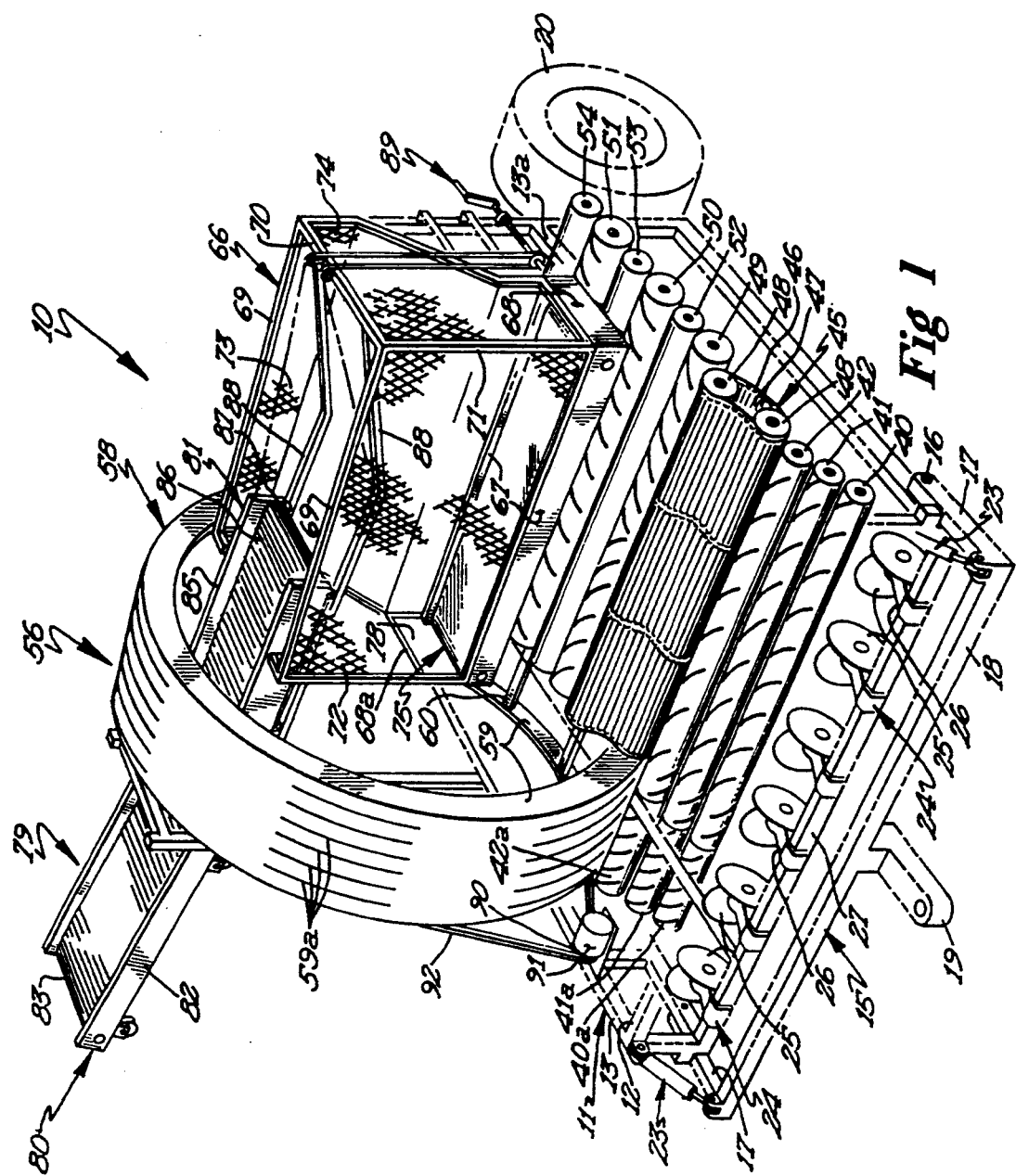
FIG. 1 is a perspective view of the novel beet harvester.

Referring now to the drawings and more specifically to FIG. 1, it will be seen that one embodiment of the novel beet harvester apparatus, designated generally by the reference numeral 10, is thereshown. The apparatus 10 includes a generally rectangular shaped main frame 11 including a front transverse frame member 12, a left side frame member 13, a right side frame member 13a and a rear transverse frame member 14. A U-shaped hitch frame 15 is secured to the main frame 11 and projects forwardly therefrom. The U-shaped frame 15 includes a pair of longitudinal frame member 17 which are pivotally connected to the main frame 11 by pivot 16 and these longitudinal frame member 17 are interconnected together at their front end by a transverse frame member 18. An elongate tow bar or tongue 19 is rigidly secured to the central portion of the transverse frame member 18 and projects forwardly therefrom.

The beet harvester apparatus 10 also includes a plurality of rear ground engaging wheel assemblies 20 which are secured to the main frame by suitable standards 21. A side ground engaging wheel 22 is secured to the left side of the main frame 11 and cooperates with the rear ground engaging wheel assemblies and the towing vehicle to support the beet harvester apparatus for travel over the surface of the ground. A pair of hydraulic rams 23 extend between the main frame 11 and the U-shaped hitch frame 15 for shifting the hitch frame between a lowered operative position and an elevated transport position.

The beet harvester apparatus also includes a plurality of lifter wheel assemblies 24, each assembly including a pair of lifter wheels journaled on a standard 26 and clamped by suitable clamps to an elongate transverse tool bar 27.

An impeller assembly 28 is provided for moving or impelling beets or potatoes excavated by the lifter wheels that are moved laterally of the lifter wheels through openings therein. The impeller assembly 28 includes an elongate transverse shaft 29 which is connected by suitable drive means (not shown) for rotation during the harvesting operation. In this regard, the power for the drive means will be provided by the towing tractor and comprising the hydraulic system of the tractor. The shaft 29 has a plurality of impellers 30 secured thereto for rotation therewith and each impeller includes a plurality of substantially flat plates 31 rigidly secured to a hub 32 which is secured to the revolvable shaft 29. Each plate 31 has a yieldable flap 33 secured thereto and projecting outwardly therefrom. It is pointed out that the impellers 30 are located between each pair of lifter wheel assemblies 24 and serve to impel rearwardly those beets or potatoes which fall into the space between adjacent pair of lifter wheel assemblies.

Means are also provided for guiding beets or potatoes excavated by the lifter wheels 25 in a rearward direction to the grab rollers and for also shielding the rollers from dirt and debris produced by movement of the lifter wheel assemblies. This means includes an elongate transverse shaft 34 positioned rearwardly of the impeller shaft 29 and disposed substantially parallel to. A plurality of elongate generally forwardly and downwardly inclined standards 36 are each provided with a clamping plate 35 at its upper end which cooperates with a mating clamping plate 35a for clamping each elongate standard to the transverse shaft. In this regard, suitable bolts are provided which secure the clamping plates 35, 35a for each standard 36 to the transverse shaft. The lower end of the standard 36 is provided with a substantially flat plate rigidly affixed to the lower end of the standard and disposed in substantially right angular relation therewith. A generally rectangular shaped flexible guide member 37 is secured to each rectangular shaped plate for each standard and the flexible guide member extends rearwardly therefrom. It will be noted that each of the flexible guide members 37 are positioned rearwardly of each lifter wheel assembly 24 for receiving and guiding beets or potatoes excavated by the lifter wheel assemblies. These flexible guide members guide the beets or potatoes rearwardly to the grab or cleaner rollers.

A plurality of spaced apart angular clamping plates 39 are rigidly affixed to the transverse shaft and clamp an elongate transversely extending flexible flap 38 thereto. In this regard, it will be noted that suitable bolts extend through the mating clamping plate 39 and through the upper transverse edge of the flap 38 for securing the flap to the transverse shaft 34. The flexible flap 38 extends downwardly and rearwardly to the grab rollers positioned rearwardly of the lifter wheel assemblies 24 and the flap serves to shield the grab rollers from dirt and debris produced by the excavating action of the lifter wheels.

The excavated beets or potatoes are directed by the lifter wheel assemblies and impeller to a front set of grab rollers including the grab rollers 40, 41, and 42. It will be noted that these grab rollers are journaled in suitable bearings mounted on opposite sides of the main frame 11 and are driven by suitable drive means (not shown). The grab rollers 40 is positioned forwardly of and at a slightly lower elevation than the grab roller 41. Similarly, the grab roller 41 is positioned forwardly of and at a slightly lower elevation than the grab roller 42. The grab roller 40 is provided with a helical element 40a thereon while the grab roller 41 is provided with a helical element 41a.

The grab roller 42 is also provided with a helical element 42 and all of these front grab rollers are coated with an ultra high molecular weight plastic such as polyethylene. The grab rollers 40, 41 and 42 are revolved in a direction to move the beets or potatoes from the left side of the machine to the right as viewed in FIG. 3. It will be noted that the left end portion of the grab rollers 40, 41 and 42 have the helical elements wound more tightly than the remaining portion of the rollers.

It will also be seen that the beet harvester apparatus is also provided with a short grab roller 42b which extends between the left longitudinal frame member 13 and an intermediate longitudinal wall member. The cleaning roller 42b is also provided with a helical element 42c and is coated with a suitable high molecular weight plastic material. The short grab roller 42b is positioned slightly above the roller 42 and serves to move potatoes and beets downwardly and towards the right as viewed in FIG. 3. It is also pointed out that the grab roller 42b is driven and revolved in the same direction as the grab rollers 40, 41, and 42.

The excavated beets or potatoes are moved to the right and are moved rearwardly by the continuous inflow of crop to the front set of grab rollers. As the beets or potatoes are moved to the right as viewed in FIG. 3, the beets or potatoes engage a right side wall 44a which limits further movement to the right and which cooperates with the front grab rollers to move the beets or potatoes rearwardly where they are engaged by one of three sets of chain conveyors 45.

The chain conveyors are disposed in side by side relation and each includes a pair of laterally spaced apart chains 46 comprised of conventional chain links and trained about sprockets 48. The sprockets 48 are mounted on shafts that are journaled in suitable bearings carried by the right side wall 44a and the immediate wall member 93. The individual links of the chains 46 for each chain conveyor are connected by elongate rigid transverse rods 47. It will be seen that the rear most sprocket 48 for each chain conveyor is positioned slightly higher than the front chain sprocket 48 so that the beets or potatoes are conveyed rearwardly by the chain conveyors and in a slightly upwardly inclined direction. The shafts mounting the rear sprockets are provided with suitable drive pulleys (not shown) which are connected to drive means.

The beet harvester apparatus 10 also includes a rear set of grab rollers all of which are revolvably mounted on the main frame 11 and are driven by suitable drive means (not shown). This rear set of grab rollers includes rollers 49, 50, and 51 each having a helical element wound thereon throughout substantially the length thereof. In this regard, it will be noted that the grab roller 49 has helical elements 49a thereon, and that grab roller 50 has helical elements 50a thereon. Grab roller 51 has helical element 51a thereon and it will also be noted that the helical elements on grab rollers 50 and 51 serve to move the potatoes or beets to the left as viewed in FIG. 3. It will further be noted that the helical elements 49a on grab roller 49 extend in opposite directions from the mid portion thereof. Thus the helical elements on the right side of the grab roller 49 tend to move the beets or potatoes towards the left as viewed in FIG. 3 while the helical elements on the remaining portion grab roller 49 tend to move the beets or potatoes to the right as viewed in FIG. 3. It is pointed out that the helical element 49a on the forward grab roller 49 may be wound completely in the direction of the helical elements for the grab rollers 50, 51.

The rear set of grab rollers also includes a smooth roller 52 positioned between the helical rollers 49 and 50, and smooth rollers 53 and 54 positioned on opposite side of helical roller 51. With the exception of helical roller 51 and smooth roller 53, all of the other helical and smooth rollers of the rear set of grab rollers extend between and are journaled in the right side wall 44a and the intermediate wall 13b. The helical roller 51 and the smooth roller 53 extend between the right side wall 44a and through an outlet opening 94 in intermediate wall 93 and are journaled in the outer wall 44b at the left side of the beet harvester as viewed in FIG. 3. Thus beets and potatoes are discharged from this cleaning zone containing the rear set of grab rollers through the discharge opening 94 by the conveying action of the helical roller 51 and smooth roller 53. It will be noted that the rotational axes of the rollers comprising the rear set of grab rollers are all disposed in a single horizontal plane.

The cleaned beets or potatoes are conveyed from the rear grab roller zone by the helical roller 51 and smooth roller 53 to a discharge wheel assembly 56 which is mounted within the confines of the main frame 11 and adjacent the left side of the beet harvester as viewed in FIG. 3. The discharge wheel assembly is vertically disposed and is revolvable about a transverse horizontal axis. The discharge wheel assembly includes a discharge wheel support frame 57 and a large discharge wheel 58. The discharge wheel 58 includes a pair of axially spaced apart circumferential rims 59 and a plurality of axially spaced apart circumferential annular rods 59a. The rims and rods are interconnected by a plurality of circumferentially spaced apart transversely extending lifter elements 60.

The discharge wheel assembly 56 also includes a plurality of roller support elements 61 mounted on the support frame 57 and each being journaled for vertical rotation about a horizontal transverse axis. The rollers engage the outer surface 62 of a rim 59 on the discharge wheel 58 and support the discharge wheel for rotation relative to the main frame. The discharge wheel is also provided with a circumferential sprocket element 63 located adjacent its periphery which is engaged by an endless chain 64. The endless chain 64 is also trained about a drive sprocket 90 secured to the output shaft of a hydraulic motor 91. The hydraulic motor 91 is connected by suitable conduits (not shown) to a source of hydraulic pressure located on the tractor which tows the beet harvester. It will be seen that when the drive sprocket 90 is rotated, the discharge wheel will also be rotated.

Figure 2:
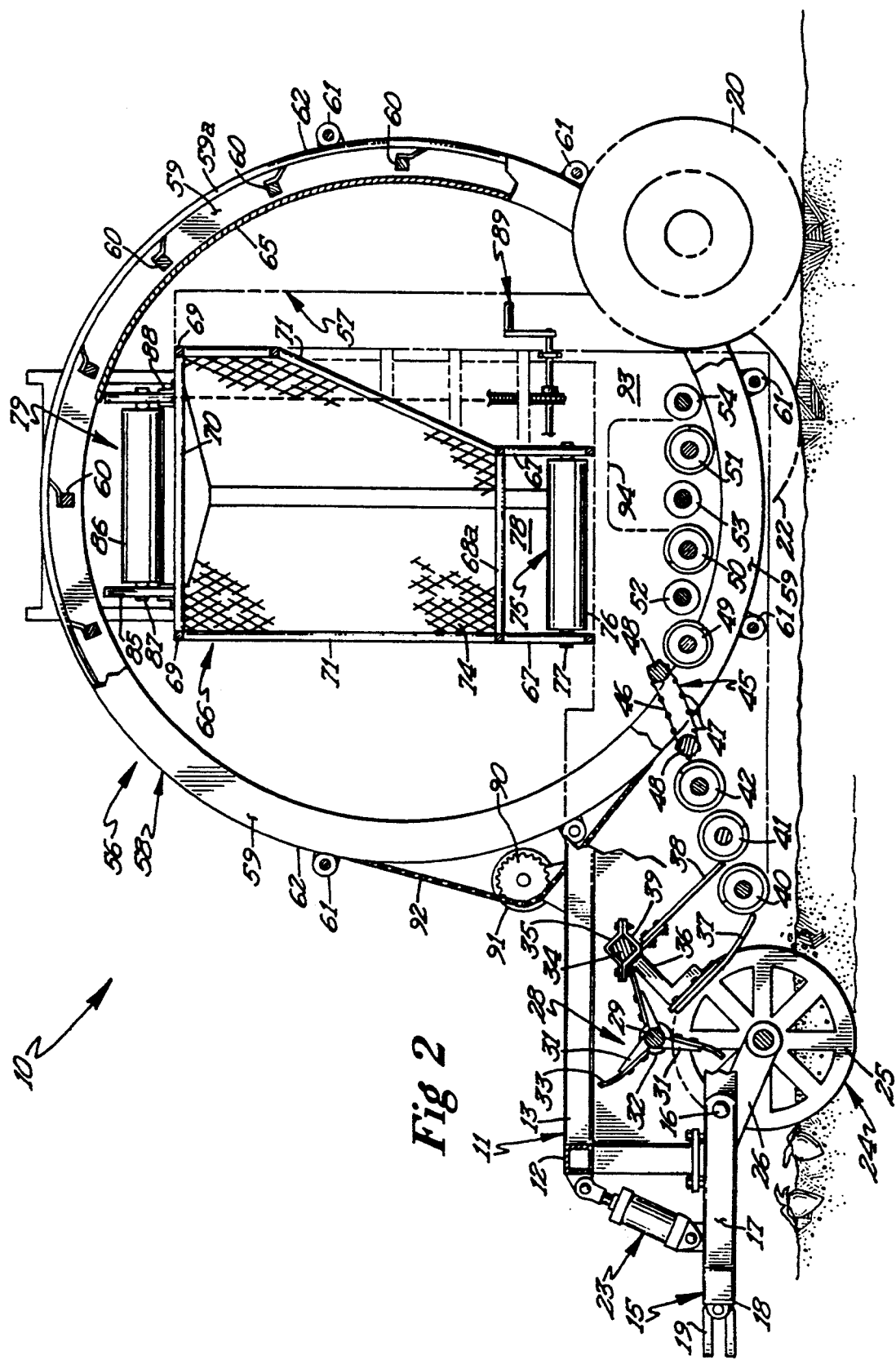
FIG. 2 is a side elevational view of the beet harvester with certain parts thereof broken away for clarity.

The discharge wheel assembly 56 is also provided with an arcuate retainer element 65 which is best seen in FIG. 2 The arcuate retainer element is formed of a suitable rigid metalic material and is coated with a high impact plastic material in the manner of the front and rear sets of grab rollers. It will be noted that the arcuate retainer element is located in the ascending arc of rotation of the discharge wheel and cooperates with the lifter elements 60 to retain the beets or potatoes as these crops are elevated to a sectional discharge conveyor.

The beets or potatoes are either discharged into a truck for transportation to a processing site or are temporarily held in a holding tank for holding the beets or potatoes until a truck is available. The harvester apparatus 10 is provided with an end holding tank 66 which is mounted at the rear of the main frame 11. The holding tank is comprised of a frame including elongate lower transverse frame element 67 which are interconnected by lower longitudinal frame elements 68. The frame for the holding tank also includes an upper transverse frame elements 69 which are rigidly interconnected by longitudinal frame elements 70. Suitable vertical frame elements 71 interconnect the respective ends of the transverse and longitudinal frame elements together. The storage tank 66 includes a front wall 72, a rear wall 73 and opposed end walls 74 all formed of expanded metal.

A horizontally disposed transversely extending endless conveyor 75 defines the lower wall of the holding tank 66. The endless conveyor 75 includes a conveyor belt 76 mounted on suitable rollers 77. One of the rollers is connected to a source of power (not shown) for power driving the roller for driving the endless conveyor 75 to move the upper run of the conveyor belt towards the discharge wheel 58. The lower end portion of the tank 66 is provided with an opening 78 which communicates with the interior of the discharge wheel 78. Beets or potatoes within the holding tank 66 will be continuously discharged therefrom by the conveyor 75 through the opening 78 upon the discharge wheel 58.

The beets or potatoes that are elevated by the discharge wheel 58 are transferred to an upper sectional discharge conveyor 79. The discharge conveyor 79 is reversible and is also transversely shiftable between a retracted position and an outwardly extended position. The sectional conveyor 79 is disposed in the retracted position during transport and is shifted to the extended position during operation of the beet harvester apparatus.

The sectional discharge conveyor 79 includes an outer conveyor section 80 and an inner conveyor section 81. The outer conveyor section includes an outer conveyor frame 82 which journals transversely spaced apart conveyor rollers 84 about which is trained conveyor belt 83. The inner conveyor section 81 includes an inner conveyor frame 85 having conveyor rollers 87 journaled thereon and about which is trained an endless conveyor belt 86. The outer conveyor section 80 of the sectional discharge conveyor may be angularly adjusted relative to the inner conveyor section and retained in an angularly adjusted position since these sections are pivotally connected together and suitable retaining means (not shown) may be provided for releasably locking the outer section in an adjusted angular position.

The conveyor belts of the inner and outer conveyor sections are driven by suitable reversible hydraulic motors (not shown). When the sectional discharge conveyor 79 is in the extended position, the inner end of the inner conveyor section 81 will be disposed over the upper end of the holding tank 66 while the upper end of the inner conveyor section will be positioned below the upper portion of the discharge wheel 58. Therefore beets and potatoes will be transferred by the discharge wheel to the inner conveyor section 81 where the beets or potatoes may be selectively transfered to the outer conveyor and then into a truck or, alternatively, may be discharged into the holding tank 66. Operation of the sectional conveyor 79 in one direction causes the beets or potatoes to be discharged in in the truckbody, while operating the sectional conveyor 79 in the other direction causes the crop to be discharged into the holding tank.

A guide structure 88 in the form of a pair of tracks is mounted on the frame of the holding tank 66 and on the frame of the discharge wheel assembly. The guide structure 88 is engaged by rollers on the sectional conveyor 79 to permit the sectional conveyor to be moved between an extended position, as illustrated in FIG. 1, and a retracted position (not shown). When the sectional conveyor 79 is in the retracted position, the inner conveyor section 81 will have its free end positioned adjacent the right end portion of the holding tank 66 as viewed in FIG. 1.

Suitable cables 88 are connected to outer conveyor section 80 and is wound about a crank 89. This arrangement permits the sectional conveyor 79 to be retracted for transportation. It will be noted that the guide structure 88 is declined from the right end thereof, as viewed in FIG. 1, towards the central portion of the guide structure. This arrangement permits shifting of the sectional conveyor to the extended position by action of gravity when released from the retraced position.

During operation of the beet harvester 10, the apparatus will be connected to a suitable tractor or other prime mover and the various driven components of the beet harvester apparatus will be connected by suitable conduits to the tractor hydraulic system. The hitch frame 15 will be actuated to shift the hitch frame to the lowered position and thereby cause the lifter wheels 25 to move to a lowered excavating position as the beet harvester is moved forward during the harvesting operation. The lifter wheel assemblies will excavate the beets or potatoes and the excavated beets or potatoes will be directed rearwardly by the flexible guide members 37 to the front set of grab rollers. Any beets or potatoes which fall between adjacent sets of lifter wheel assemblies will be impelled rearwardly by the impellers 30.

It will be seen that the root crops will be moved rearwardly to the front set of grab rollers along the entire length of the front set as best seen in FIG. 3. In this regard, it will be seen that the helical elements for each grab roller at the respective left ends thereof are more closely wound and therefore tend to move the beets or potatoes more rapidly towards the right as viewed in FIG. 3. Since the short grab roller 42b is positioned above the grab roller 42, the coaction between the grab roller 42 and 42b simply causes the beets or potatoes to be moved to the left during the cleaning operation. The interaction action between the beets, potatoes or other crop roots and grab rollers as they are moved by these front grab rollers effectively remove mud, debris and the like. The plastic coating of the rollers and helical elements minimizes any damage to the beets or potatoes and thereby insures a greater yield with respect to this phase of the harvesting operation.

The front set of grab rollers effectively cleans the beets or potatoes as the root crops are removed from the left to the right as viewed in FIG. 1. Movement in that direction will be stopped by the right side wall of the harvester and the beets or potatoes will eventually be moved to the chain conveyors 45 where the beets or potatoes will be moved rearwardly and upwardly by the chain conveyors. It will be noted that the chain conveyors deliver the beets or potatoes to the rear set of grab rollers for further cleaning. The helical elements on the grab rollers 49 and 50 and 51 are wound about the rollers to move the beets or potatoes to the left as viewed in FIG. 1. The helical elements 49a for the left end portion of front grab roller 49 of the rear set of grab rollers is wound in a direction to move the beets or potatoes to the right in the manner of the grab rollers comprising the front set. However, since this particular feature is optional, the front grab roller 49 may be constructed to have the helical element wound in the same direction throughout the length thereof to deliver the beets or potatoes to the left.

The beets or potatoes will be moved to the left, as viewed in FIG. 1, by the rear set of grab rollers which includes the helical wound rollers 49, 50, and 51 along with the smooth rollers 52, 53 and 54. During this movement, the beets or potatoes will be subjected to a cleaning action by these grab rollers until the beets or potatoes are conveyed by the grab rollers 51 and 53 through the opening 94 in the wall 93 of the beet harvester. It is again pointed out that the provision of the rear set of grab rollers with a high impact plastic coating minimizes damage to root crop during this final phase of cleaning. The beets or potatoes will fall from the extended ends of the grab rollers 51 and 53 upon the inner surface of the discharge wheel 58.

As the beets fall upon the discharge wheel 58, rotation of the wheel causes the beets or potatoes engaged by the lifter elements 60 to be moved upwardly between the circumferential rods 59a of the discharge wheel and the arcuate retainer element 65. Since the beets or potatoes are moved over the surface of the arcuate retainer element, the plastic coating of this retainer element minimizes or prevents damage to the beets or potatoes. The beets or potatoes are moved upwardly until the beets or potatoes fall upon the conveyor belt 86 of the inner conveyor section where the beets or potatoes are moved outwardly to the outer conveyor section and ultimately discharge therefrom to fall into the truck body of a truck.

When the truck is filled, the operation of the sectional discharge conveyor 79 is reversed and the inner conveyor 86 will discharge the potatoes or beets into the end holding tank 66 where the beets or potatoes are temporarily stored until a truck is available to transport the beets or potatoes to a processing site. The conveyor 75 will then be operated to discharge the beets or potatoes from the storage tank to the discharge wheel where the beets or potatoes will then be conveyed or transfered to the upper sectional discharge conveyor 79 for discharge into a truck.

The design and construction of the beet harvester apparatus provides several distinct advantages over the conventional beet harvester. The arrangement of the front and rear sets of grab rollers maximizes the cleaning effect with respect to the beets or potatoes thereby allowing the beet harvester apparatus to be moved more rapidly through the field during the harvesting operation. Thus the beet harvester excavates and cleans beets or potatoes in a more efficient manner and performs the same volume as a conventional beet harvester of greater width. It is pointed out that the beet harvester apparatus is also highly effective in harvesting carrots.

The use of a high impact plastic coating for the grab rollers also minimizes damage to the beets or potatoes and thereby maximizes the yield. Performance tests have indicated that the beet harvester apparatus 10 saves 1.37 to 4.5 tons more beets per acre by avoiding damage to the beets during the harvesting operation.

The positioning of the discharge wheel within the confines of the beet harvester frame, retains the narrow profile of the beet harvester and permits easier transport of the harvester from one place to another. The location of the holding tank 66 at the rear of the vehicle permits ready and convenient holding of the beets without diminishing the cleaning areas of the beet harvester. The retractable discharge conveyor 79 also permits ready loading of the truck and also permitting easy transport of the beet harvester by retracting the discharge conveyor to the transport position.

Thus it will be seen that I have provided a novel and improved beet harvester which functions in a more efficient manner than any comparable conventional beet harvester.

What is claimed is:

1. A beet harvester including a main frame, ground engaging wheels on said main frame, a lifter wheel assembly for excavating and directing beets, potatoes, carrots and similar root crops in a rearward direction, a front set of grab rollers positioned rearwardly of the lifter wheel assembly and including a plurality of elongate similar revolvably driven front grab rollers disposed in side by side parallel relation and extending transversely of and journaled in said frame, said grab rollers having a helical element thereon and being provided with a coating of high impact plastic material, said grab rollers when revolved moving the crop received from the lifter wheel assembly laterally and rearwardly while simultaneously cleaning the harvested crop, a rear set of grab rollers positioned rearwardly of said front set of grab rollers, conveyor means interposed between said front and rear sets of grab rollers for conveying harvested crop in a rearward direction from the front set of grab rollers to the rear set of grab rollers, said rear set of grab rollers including a plurality of elongate revolvably driven rear grab rollers disposed in side-by-side relation and extending transversely of said main frame, certain of said rear grab rollers having helical elements thereon and being provided with a coating of high impact plastic material, said rear grab rollers when revolved moving the harvested crop rearwardly and laterally in a direction opposite to the front set of grab rollers to continuously clean the harvested crop, a vertically disposed discharge wheel assembly including a support frame secured to said main frame, a vertically disposed discharge wheel, means revolvably mounting said discharge wheel on the support frame for vertical rotation about a horizontal axis extending transversely of the main frame, a plurality of transversely extending circumferentially spaced apart lifter elements secured to the inner circumferential surface of the lifter wheel for lifting the harvested crop during rotation of the wheel, means for rotating said discharge wheel, an upwardly opening holding tank mounted on the rear end portion of the main frame, an elongate driven reversible discharge conveyor having an outer end and an inner end, means mounting said conveyor on said main frame to position the discharge conveyor such that the conveyor projects through the discharge wheel adjacent the upper portion thereof, said inner end of said discharge conveyor being positioned above the holding tank whereby said discharge conveyor when driven in one direction, discharging the harvested crop received from the discharge wheel from the outer end for discharging to a truck, and when driven in the opposite direction discharging the harvested crop into the holding tank.

2. The beet harvester as defined in claim 1 wherein said discharge wheel assembly is positioned interiorly of said main frame.

3. The beet harvester as defined in claim 1 wherein said second set of grab rollers includes rollers with helical elements thereon and smooth rollers, said smooth rollers being arranged in alternate relation with the rollers having the helical elements thereon.

4. The beet harvester as defined in claim 3 wherein the rotational axes of the front set of grab rollers are each respectively located at a higher elevation starting from the front roller to the rearmost of the front set of rollers.

5. The beet harvester as defined in claim 4 wherein the axes for the rear set of rollers are disposed in substantially a horizontal plane.

6. The beet harvester as defined in claim 2 wherein two of the grab rollers of the rear set extend through the discharge wheel.

7. The beet harvester as defined in claim 6 including an arcuate retainer member secured to the support frame and being disposed in closely spaced concentric relation with the inner surface of the discharge wheel, said retainer member having a high impact coating of plastic material and cooperating with the lifter elements on the discharge wheel to convey the harvested crop to said discharge conveyor.

8. The beet harvester as defined in claim 1 including a driven lower transversely extending horizontal conveyor mounted on the lower end portion of said holding tank and defining the lower wall of the holding tank, said lower conveyor having a discharge end positioned within said discharge wheel above the lower surface thereof to discharge harvested crop upon the inner lower portion of the discharge wheel when the lower conveyor is driven.

9. The beet harvester as defined in claim 1 wherein said discharge conveyor is shiftable between an extended and retracted position, said discharge conveyor when in the retracted position having its inner end positioned adjacent one side of the main frame.

10. A beet harvester including a main frame, ground engaging wheels on said main frame, a lifter wheel assembly for excavating and directing beets, potatoes, carrots and similar root crops in a rearward direction, a front set of grab rollers positioned rearwardly of the lifter wheel assembly and including a plurality of elongate similar revolvably driven front grab rollers disposed in side by side parallel relation and extending transversely of and journaled in said frame, said grab rollers having a helical element thereon, said grab rollers when revolved moving the crop received from the lifter wheel assembly laterally and rearwardly while simultaneously cleaning the harvested crop, a rear set of grab rollers positioned rearwardly of said front set of grab rollers, conveyor means interposed between said front and rear sets of grab rollers for conveying harvested crop in a rearward direction from the front set of grab rollers to the rear set of grab rollers, said rear set of grab rollers including a plurality of elongate revolvably driven rear grab rollers disposed in side-by-side relation and extending transversely of said main frame, certain of said rear grab rollers having helical elements thereon, said rear grab rollers when revolved moving the harvested crop rearwardly and laterally, to continuously clean the harvested crop, a vertically disposed discharge wheel assembly positioned interiorly of said main frame and including a support frame secured to said main frame, a vertically disposed discharge wheel, means revolvably mounting said discharge wheel on the support frame for vertical rotation about a horizontal axis extending transversely of the main frame, a plurality of transversely extending circumferentially spaced apart lifter elements secured to the inner circumferential surface of the lifter wheel for lifting the harvested crop during rotation of the wheel, means for rotating said discharge wheel, an upwardly opening holding tank mounted on the rear end portion of the main frame, an elongate driven reversible discharge conveyor, means mounting said conveyor on said main frame to position the discharge conveyor such that the conveyor projects through the discharge wheel adjacent the upper portion thereof, said discharge conveyor being positioned above the holding tank whereby said discharge conveyor when driven in one direction, discharging the harvested crop received from the discharge wheel into a mobile, container including a truck mounted container, and when driven in the opposite direction discharging the harvested crop into the holding tank.

* * * * *